United States Patent [19]

Singbartl

[11] Patent Number: 5,339,764

[45] Date of Patent: Aug. 23, 1994

[54] DEVICE FOR OPTICALLY INDICATING THE PRESSURE OF A MEDIUM

[75] Inventor: Günther Singbartl, Hanover, Fed. Rep. of Germany

[73] Assignee: WABCO Standard GmbH, Hanover, Fed. Rep. of Germany

[21] Appl. No.: 51,536

[22] Filed: Apr. 21, 1993

[30] Foreign Application Priority Data

May 4, 1992 [DE] Fed. Rep. of Germany ....... 4214804

[51] Int. Cl.5 .................. G01L 17/00; B60C 23/02; G08B 5/00
[52] U.S. Cl. .................. 116/266; 116/34 R; 116/202; 116/270; 116/272
[58] Field of Search ............... 73/146.2, 146.3, 146.8, 73/744; 116/34 R, 202, 220, 266, 270, 272, 279, DIG. 7; 137/227

[56] References Cited

U.S. PATENT DOCUMENTS

| 2,579,120 | 12/1951 | Mercer | 116/34 R |
|---|---|---|---|
| 2,948,256 | 8/1960 | Tapp | 116/34 R |
| 3,129,689 | 4/1964 | Henderson et al. | 116/34 R |
| 3,492,968 | 2/1970 | Workman | 116/70 |
| 3,780,693 | 12/1973 | Parr | 116/270 |
| 4,164,196 | 8/1979 | Stradella et al | 116/202 |
| 4,362,121 | 12/1982 | Pergram | 116/34 R |
| 4,499,846 | 2/1985 | Bergeron et al. | 116/272 |
| 4,688,512 | 8/1987 | Alper et al. | 116/34 R |
| 5,027,740 | 7/1991 | Kramer et al. | 116/34 R |

FOREIGN PATENT DOCUMENTS

| 217885 | 11/1976 | Australia . | |
| 950693 | 3/1956 | Fed. Rep. of Germany . | |
| 1190689 | 4/1965 | Fed. Rep. of Germany . | |
| 2133121 | 1/1973 | Fed. Rep. of Germany . | |
| 2426923 | 12/1974 | Fed. Rep. of Germany . | |
| 2508271 | 9/1976 | Fed. Rep. of Germany . | |
| 2518859 | 11/1976 | Fed. Rep. of Germany . | |
| 2654104 | 6/1978 | Fed. Rep. of Germany . | |
| 2032839 | 3/1979 | Fed. Rep. of Germany | 116/202 |
| 3012265 | 10/1981 | Fed. Rep. of Germany . | |
| 3832252 | 1/1990 | Fed. Rep. of Germany . | |
| 4007388 | 5/1991 | Fed. Rep. of Germany . | |
| 9101107 | 10/1991 | Fed. Rep. of Germany . | |
| 2464468 | 3/1981 | France . | |
| 2479465 | 10/1981 | France . | |
| 8807663 | 10/1988 | PCT Int'l Appl. . | |
| 0322678 | 1/1972 | U.S.S.R. | 116/272 |
| 0516929 | 7/1977 | U.S.S.R. | 73/744 |
| 1005837 | 3/1983 | U.S.S.R. | 116/266 |
| 2200993 | 8/1988 | United Kingdom . | |
| 2229003 | 9/1990 | United Kingdom . | |

Primary Examiner—William A. Cuchlinski, Jr.
Assistant Examiner—Willie Morris Worth
Attorney, Agent, or Firm—Lippe, Goldstein, & Meltzer

[57] ABSTRACT

A device for optically displaying the pressure of a medium comprises a housing, a piston within the housing which is movable along a longitudinal axis against a restoring force, and an optically transparent element within the housing having a display surface which is visible from outside the housing. An inner wall of the optically transparent element delimits a cavity which is open towards the piston. A surface of a first color, e.g., green, is mounted on the piston and is movable therewith, the colored surface being received within the cavity of the optically transparent element. The optically transparent element includes a circumferential zone of a second color, e.g., red, which colored zone is not directly visible from outside the housing through the display surface. When pressure exerted by the medium on the piston is too low, the restoring force keeps the colored surface away from the inner wall and reflects light rays emanating from the colored zone through the display surface, while reflecting back the light rays from the colored surface. In this condition, the color red is visible through the display surface. When the pressure exerted by the medium overcomes the restoring force so that the colored surface presses against the inner wall, light rays emanating from the colored surface are transmitted through the display surface, while light rays emanating from the colored zone are reflected back onto the housing. In this condition, the color green is visible through the display surface.

10 Claims, 2 Drawing Sheets

DEVICE FOR OPTICALLY INDICATING THE PRESSURE OF A MEDIUM

BACKGROUND OF THE INVENTION

The instant invention relates to a device for optically indicating the pressure of a medium, in particular, the air pressure in a vehicle tire.

A device of this type is known from DE 40 07 388 C2. This known device has an optically transparent element which consists of a light-screening element and a balloon connected to same, said balloon being filled with a light-absorbing liquid. The optically transparent element interacts with a piston capable of being moved towards and away from the optically transparent element. The piston is coated with a color layer on its side facing towards the optically transparent element. The movement of the piston towards the optically transparent element is caused by the pressure of a medium pressing the piston in opposition to the force of a spring. The movement of the piston away from the optically transparent element is caused by the force of the spring when the pressure drops.

If no pressure or only little pressure is present and acting upon the piston so that no pressure is exerted by the piston upon the balloon of the optically transparent element, the entire flat light-screening element is filled evenly with the light-absorbing liquid in the balloon. In this state, the light reflected by the color layer on the piston is absorbed by the light-absorbing liquid. The light falling on the color layer of the piston is therefore screened by the light-absorbing liquid in the balloon so that the color layer is not visible from the outside.

If the piston is moved by the pressure of the medium towards the optically transparent element until the piston surface coated with the color layer is pressed against the balloon containing the light-absorbing liquid, the liquid recedes into the border zone of the balloon. The sides of the balloon facing each other come into contact with each other so that light is no longer absorbed by the light-absorbing liquid. The light reflected from the color layer of the piston traverses the optically transparent element so that the color layer of the piston becomes visible from the outside.

This known device has the disadvantage of being relatively expensive to make and also delicate. For example, leaks may occur in the balloon containing the light-absorbing liquid so that the liquid is lost and the device thereby becomes ineffective in indicating the pressure of a medium.

It is the object of the instant invention to provide a device for the optical indication of the pressure exerted by a medium which device is simple in construction as well as inexpensive and reliable in operation.

SUMMARY OF THE INVENTION

In accordance with the present invention, a device for optically displaying the pressure of a medium comprises a housing, a piston within the housing which is movable along a longitudinal axis against a restoring force, and an optically transparent element within the housing having a display surface which is visible from outside the housing. An inner wall of the optically transparent element delimits a cavity which is open towards the piston. A surface of a first color, e.g., green, is mounted on the piston and is movable therewith, the colored surface being received within the cavity of the optically transparent element. The optically transparent element includes a circumferential zone of a second color, e.g., red, which colored zone is not directly visible from outside the housing through the display surface. When pressure exerted by the medium on the piston is too low, the restoring force keeps the colored surface away from the inner wall and reflects light rays emanating from the colored zone through the display surface, while reflecting back the light rays from the colored surface. In this condition, the color red is visible through the display surface. When the pressure exerted by the medium overcomes the restoring force so that the colored surface presses against the inner wall, light rays emanating from the colored surface are transmitted through the display surface, while light rays emanating from the colored zone are reflected back onto the housing. In this condition, the color green is visible through the display surface.

The invention offers in particular the advantage of producing an optical indication in the form of a color change by utilizing the physical effect of total reflection as well as by providing a colored zone, e.g., in the form of a colored strip on the optically transparent element, and by providing a different color to the colored surface which is moved by the piston.

A second advantage of the invention consists in the fact that the change in the pressure of the medium can be recognized from a change in color in the area of the display surface of the optical element which can be made in the form of a viewing window. In a further development of the invention, the optically transparent element has a lens-shaped surface curvature in the form of a convex lens in the area of the display surface. This leads to an enhanced recognition of the color appearance in the area of the display surface of the optically transparent element.

In another embodiment of the invention, the part supporting the color surface which is moved by the piston is made of an elastic, flexible material such as an elastomer. Such a material ensures that any possible unevenness on the wall delimiting the cavity of the optically transparent element (i.e., the interface) is compensated for through the elasticity of this part. It is therefore not necessary to make the wall (interface) delimiting the cavity of the optically transparent element as an absolutely smooth surface. Thanks to this measure, minor unevenness of the wall (interface) delimiting the cavity of the optically transparent element can thus be accepted.

The cavity is advantageously conical in shape, at least in its region across from the colored zone; accordingly, the part supporting the color layer and reaching into the conical region of the cavity of the optically transparent element is also conical. The cavity can also have a shape other than conical, in which case the part reaching into the cavity will conform to this shape.

The restoring force acting on the piston is advantageously produced by an element made of an elastomeric material, wherein this element is placed between the sides of the optically transparent element facing each other and the piston.

In another embodiment of the invention, the colored zone is constituted by a seal made of an elastomeric material, said seal being located between the optically transparent element and the area of the housing containing the optically transparent element which faces it.

In an advantageous further embodiment of the invention, the piston is made in the form of a membrane with an integral elastomeric filling piece supporting the colored surface for the cavity of the optically transparent element.

The colored zone is preferably poured or injected into the optically transparent element.

BRIEF DESCRIPTION OF THE DRAWINGS

Four different embodiments of the invention are explained below in greater detail through the drawings in which.

DETAILED DESCRIPTION OF PREFERRED EMBODIMENTS

Figure 1:
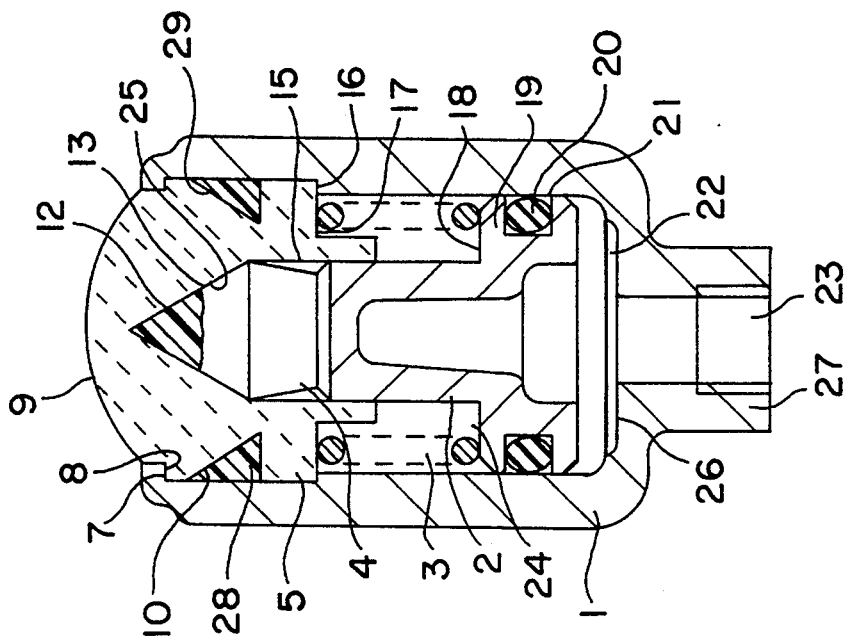
FIG. 1 shows a device according to the invention for the optical display of the pressure of a medium.

FIG. 1 shows a pot-shaped housing (1) the bottom portion (26) of which is provided with a connection piece (27) with a passage opening (23) leading into the inner space (24) of the housing. The housing (1) contains a piston (2,19) capable of moving along the direction of the longitudinal axis of the housing (1). The piston (2,19) is provided with a sealing ring (20) placed in a circumferential groove of a lower part (19) of the piston (2,19).

An optically transparent element (5,9) having a display surface (9) visible from the outside is set into the open front of the pot-shaped housing (1) across from the housing bottom (26). The optically transparent element (5,9) protrudes slightly out of housing (1) away from the bottom (26) of housing (1). This protruding region which constitutes the display surface (9) and serves as a viewing window is provided with a convex surface curvature in the form of a lens.

The region of the optically transparent element (5,9) facing towards the bottom (26) of housing (1) rests with an annular surface (17) on a projection (16) of the inner wall of housing (1).

The optically transparent element (5,9) is held in place by a surrounding projection (7) of the wall of housing (1) extending towards said optically transparent element (5,9). The projection (7) of housing (1) is produced through a modification of the shape of the border area of the housing (1). The projection (7) is in contact with a surface (8) of the optically transparent element (5,9) located in proximity to the lens-shaped surface curvature of the optically transparent element (5,9). Other means for attaching the optically transparent element (5,9) to or in the housing (1) are also possible, such as, for example, a screw-on ring.

The optically transparent element (5,9) is provided with a cavity (11,14) which is open towards the piston (2,19), said cavity serving to receive a color surface (12) capable of being moved by the piston (2,19) when said piston (2,19) is moved along the direction of the longitudinal axis of the cavity (11,14).

The inner space (24) of the housing (1) contains a compression spring (3) which bears with one end upon an annular surface (17) of a surrounding projection of the optically transparent element (5,9) directed towards the inner space (24) of the housing. The compression spring (3) acts with its other end upon the lower part (19) of the piston (2,19) pushing the piston away from the optically transparent element (5,9) or display surface (9). With its side away from the optically transparent element (5,9), the piston (2,19) delimits a pressure chamber (22) connected to the passage opening (23) serving as a connection to the pressurization means.

The connection to the pressurization means can be connected to the inflation valve of a vehicle tire, for instance.

An extension (2) of the piston (2,19) extends in the direction of the cavity (11,14) of the optically transparent element (5,9) from an annular surface (18) of the piston (2,19) which, as mentioned earlier, is subjected to the force of the compression spring (3). The extension (2) of piston (2,19) is guided by a wall (15) delimiting the cylindrical portion (14) of the cavity (11,14). The cavity (11,14) of the optically transparent element (5,9) has a conical portion (11) following the cylindrical portion (14), said conical portion (11) tapering off in a direction away from the cylindrical portion (14) and extending into the optically transparent element (5,9).

On the extension (2) of piston (2,19), a part (4) connected to the piston is installed, and in the portion of the cavity (11,14) which is conical, said part (4) also has a conical shape to match this conical shape of the cavity (11,14). The conical region (12) of the part (4) connected to the extension (2) of piston (2,19) is made of an elastically deformable material.

The conical region (11) of the cavity (11,14) forms an angle, e.g., of approx. 60°. The conical region (12) of the extension (2) of the piston (2,19) preferably forms a smaller angle than the conical region (11) of the cavity (11,14). This difference in angle makes it possible to obtain a better filling action and resetting action.

The optically transparent element (5,9) is provided with a cavity (10) on its side away from the contact surface (17) of the compression spring (3), and a wall (29) of said cavity (10) across from the conical surface (13) extends at an angle to and preferably concentrically with the longitudinal axis of the optically transparent element (5,9), whereby said wall (29) extends from an interior portion of the optically transparent element (5,9) going to the outer circumferential surface of the optically transparent element. The wall (13) of cavity (11,14) delimiting the conical region (11) of said cavity (11,14) of the optically transparent element (5,9) and the wall (29) facing it and delimiting the cavity (10) together form an angle of, e.g., approximately 60°.

A colored surface is sprayed or produced by integrated pouring on the wall (29) and forms a colored zone (6). The color of this colored zone (6) is preferably red and fluorescent in daylight since red is highly effective for signalling and since the fluorescent effect further heightens recognition.

The conical region of part (4) which is connected to the piston (2,19) is made of an elastically deformable material. At least this region of part (4) connected to the piston (2,19) is provided with a colored surface (12) in the area which comes into contact with the totally reflecting interface between the wall (13) of the optically transparent element (5,9) delimiting the conical region (11) and the adjoining air layer when part (4) is introduced into cavity (11,14). The colored surface (12) is preferably green so that it is in strong contrast with the red color of the colored strip constituting the colored zone (6).

Figure 2:
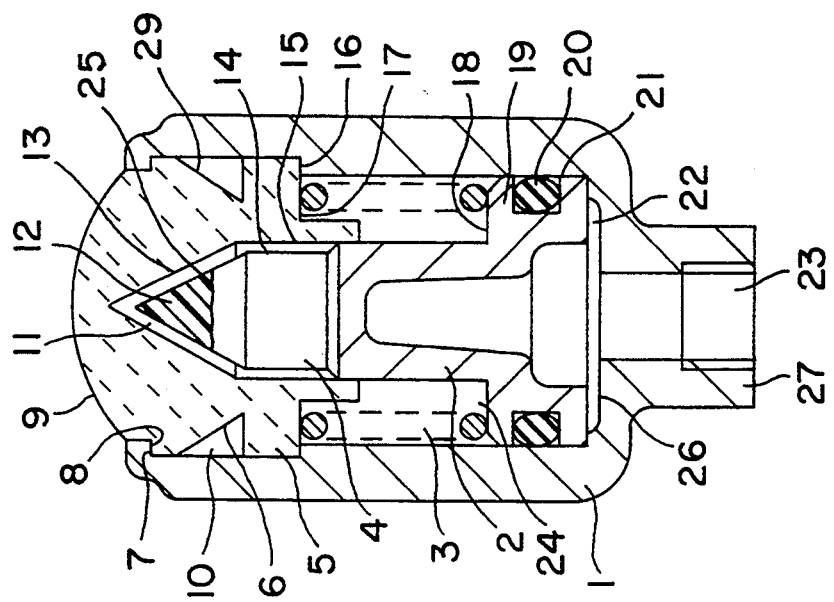
FIG. 2 shows a device substantially identical with the device shown in FIG. 1, in which the colored zone is constituted, however, by a sealing element made of an elastic material.

FIG. 2 shows a device which is substantially the same as the device according to FIG. 1. For the sake of clarity, the components which are the same in FIGS. 1 and 2 are given the same reference numbers. Since these are devices which are directly comparable with each other, only the details by which the device of FIG. 2 is different from the device of FIG. 1 are discussed here.

As in FIG. 1, the optically transparent element (5,9) in FIG. 2 is also provided with a cavity (10) in its circumferential surface, the wall (29) of said cavity extending at an angle to and preferably concentrically with the longitudinal axis of the optically transparent element (5,9) so that wall (29) and wall (13) form an angle of, e.g., 60°.

A colored elastomer seal (28) is provided in the cavity (10) and is in sealing contact with wall (29) of cavity 10 with its one side. With its side away from the optically transparent element (5,9), elastomer seal (28) is in sealing contact with the inside wall of housing (1) of the device, thus preventing dirt and moisture from entering through the gap between the outer circumferential wall of the optically transparent element (5,9) and the inside wall of housing (1).

The elastomer seal (28) is also preferably red in color, similarly to the colored strip (6) in FIG. 1. The conical colored surface (12) of the elastically deformable part (4) connected to piston (2,19) which penetrates the conical region (11) of cavity (11,14) is preferably green.

The operation of the above-described devices according to FIGS. 1 and 2 is explained in greater detail below.

As mentioned earlier, the colored zone formed in FIG. 1 by the colored strip (6) is replaced by a colored elastomer seal (28) in the device according to FIG. 2. The function of the device according to FIG. 2 is the same as the one according to FIG. 1.

FIG. 1 shows the state of the device when tire pressure is too low and FIG. 2 shows the state of the device when tire pressure is correct.

If the force of pressure coming from a tire filled with compressed air, for example, prevailing in the pressure chamber (22) and pushing piston (2,19) against the force of the compression spring (3), is equal to or less than the force directed by the compression spring (3) in the opposite direction upon the piston (2,19) when tire pressure is insufficient, said piston (2,19) and thereby also part (4) which is connected to the piston is in the position shown in FIG. 1.

In this position, an air-filled gap (11,14) exists between the wall (13) and the outer circumferential surface of the part (4) connected to the piston (2,19). Light rays emanating from the colored zone (6) or (28) are reflected totally by the optical wall (13)/air interface and are directed upon the display surface (9). This optical wall (13)/air interface additionally reflects light rays coming from the colored surface (12) in such manner that these cannot reach the display surface (9). As a result the display surface (9) appears red.

If the pressure in the vehicle tire increases from a minimum pressure value to a sufficient level which can be predetermined by the force of the compression spring (3), the force of the pressure in the pressure chamber (22) causes the piston (2,19) to be moved upwards against the force of the compression spring (3) in the direction of the display surface (9), whereby the part (4) connected to the piston projects into the cavity (11,14) until it reaches its final position (shown in FIG. 2) so that the elastically deformable color surface (12) comes to lie against the wall (13) delimiting the conical portion (11) of the cavity (11,14).

The conical portion (11) of the cavity (11,14) of the optically transparent element is then completely filled by the colored surface (12) of the part (4) connected to the piston (2,19) so that the wall (13) is covered and the optical wall (13)/air interface no longer exists. As a consequence, light rays emanating from the colored zone (colored strip (6) or seal (28)) are no longer reflected from wall (13) to the display surface (9). Since the colored zone (6) or (28) is furthermore positioned and designed so that it cannot be seen directly through the display surface (9), the red color of the colored zone (6) or (28) disappears from the display surface (9).

As the optical wall (13)/air interface becomes inactive, the total reflection of the light rays emanating from the colored surface (12) are also suppressed. This has as a consequence that these light rays reach the display surface (9). As a result, the display surface (9) no longer appears red but green, since the color of the colored surface (12) of part (4) is green.

The colored strip (6) can of course also be any other color. Similarly, the colored surface (12) of the part (4) entering the cavity (11,14) can also be a different color. What is significant is that the color of the colored zone (colored strip (6) or seal (28)) distinguishes itself from the color of the colored surface (12).

Figure 4:
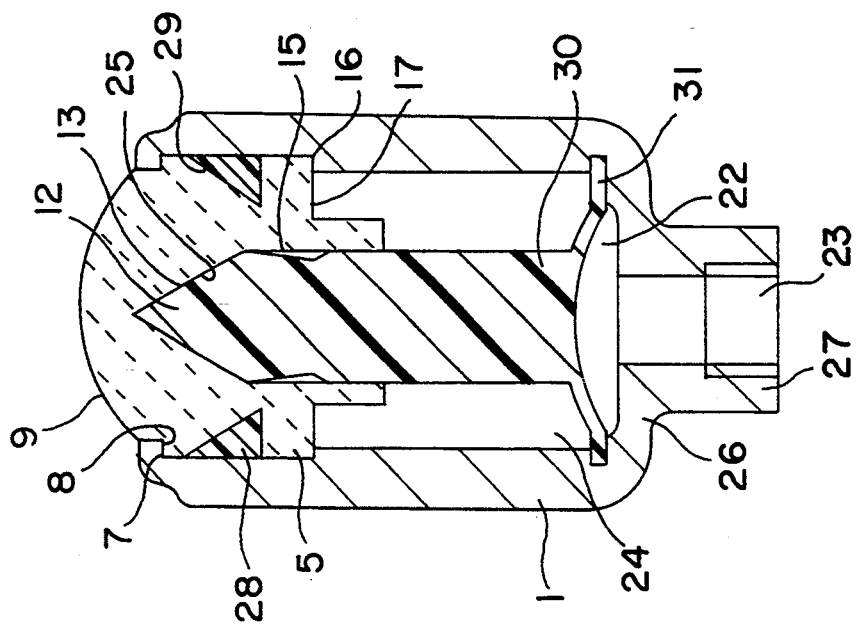
FIG. 4 shows a device comparable with the device shown in FIG. 3, in which the colored strip constituting the colored zone is replaced, however, by a colored sealing element.
Figure 3:
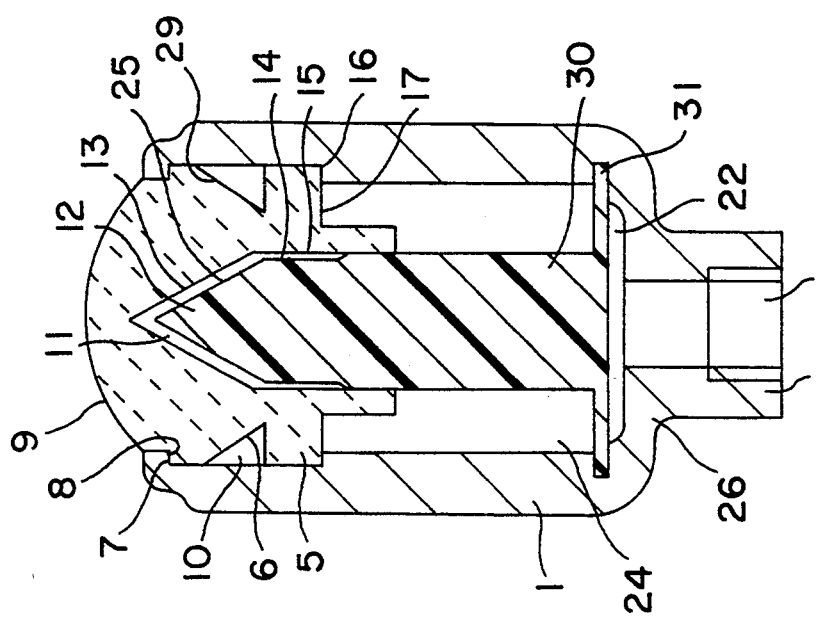
FIG. 3 shows a device comparable to the device shown in FIG. 1, in which the piston is made, however, in the form of a membrane piston supporting an integral filler piece on its side facing towards the optically transparent element, said filler piece interacting with the optically transparent element.

FIGS. 3 and 4 show devices similar to the devices shown in FIGS. 1 and 2. In FIG. 3 as well as in FIG. 4, a membrane piston (31) is used instead of a piston capable of being shifted in housing (1) against the force of a compression spring, said membrane piston (31) being provided with an integral piece (30) made of plastic on its side towards the optically transparent element (5,9), said integral piece (30) extending into the cavity (11,14) of the optically transparent element. The restoring force required to reset membrane piston (31) is inherently produced by the membrane. It is of course also possible to provide a compression spring between the membrane piston (31) and the optically transparent element (9).

Preferably, the conical portion of the integral piece (30) supporting the colored surface (12) is made of an elastically deformable material which is softer than the region of this integral piece which is connected to the piston.

The piece (30) can, however, be made of a material other than plastic, such as metal, for example, and can be connected to the membrane (31) by being vulcanized to same. It is recommended, however, to make the integral piece (30) supporting the region with the colored surface (12) of a soft elastically deformable material so that this conical portion will be able to completely press against the wall (13) of the optically transparent element (5,9) delimiting the cavity (11,14).

As is the case for the piston (2) shown in FIGS. 1 and 2, the membrane piston (31) in the embodiments of FIGS. 3 and 4 delimits a pressure means chamber (22) which can be subjected to pressure via a passage opening (23) in a connection piece (27).

FIG. 3 shows an optically transparent element (5,9) with a cavity (10) in which a colored strip (6) constitutes a colored zone as in FIG. 1. Instead of this colored strip (6), the device of FIG. 4 is provided with a colored elastomer sealing element (28) such as is also provided in the device according to FIG. 2.

The housing of the devices according to FIGS. 1 to 4 may be made of metal or plastic. The optically transparent element may be a colorless plastic or glass. In the embodiments according to FIGS. 3 and 4, the piston which comprises a membrane piston is made of an elastically deformable material, and in the embodiments according to FIGS. 1 and 2, the piston may be made of metal or plastic. In the embodiments of the devices according to FIGS. 1 and 2, the piston may be provided directly with a colored surface on its side towards the optically transparent element so that an additional part connecting the piston may be omitted.

The cavity in the optically transparent element may be conical. However, it may also have some other shape that tapers off away from the piston, and this applies in that case of course also to the side of the piston towards the cavity or to its colored surface. The piston can be designed so that its side towards the inside wall of the optically transparent element can be pushed against this wall by the pressure means acting upon the piston.

It may also be possible to make the housing and the optically transparent element as one piece.

The compression spring (3) in FIGS. 1 and 2 can bear, as shown, upon the surface (17) of part (5) of the optically transparent element (5,9), but it may also bear upon a projection to be provided on the inside wall of the housing in a manner which is not shown.

Similarly, it is possible to replace the compression spring (3) of FIGS. 1 and 2 by a part made of an elastomer material, whereby this part must be installed between the sides facing each other of the optically transparent element (5,9) and piston (2,19).

In the embodiments according to FIGS. 1 and 2 and by using a colored strip (6), a separate seal can be provided either in cavity (10) or between the wall of the housing and the optically transparent element.

While the invention has been described by reference to specific embodiments, this was for purposes of illustration only. Numerous alternative embodiments will be apparent to those skilled in the art and are considered to b within the scope of the invention.

I claim:

1. Device for optically displaying the pressure of a medium, comprising
   a housing,
   a piston within said housing which is movable by the pressure exerted by said medium along a longitudinal axis from an initial position to an end position against a restoring force,
   an optically transparent element within said housing, said optically transparent element having a display surface on a first side facing away from said piston, said display surface being visible from outside said housing,
   said optically transparent element having a wall on a second side facing towards said piston, said wall delimiting a cavity which is open towards said piston,
   a surface having a first color within said housing, said surface being movable by said piston and being received within said cavity as said piston is moved by the pressure of said medium,
   said optically transparent element having a circumferential surface enveloping said longitudinal axis having a zone of a second color which is not directly visible from outside said housing through said display surface, said second colored zone being integral with said optically transparent element,
   said wall of said optically transparent element delimiting said cavity being aligned so that light rays emanating from said second colored zone are reflected by an interface formed by said wall and an adjoining air layer towards said display surface so that said second color is visible from outside said housing when said piston is not in its end position,
   said colored surface being moved by said piston to traverse said interface when the pressure of said medium is greater than a predetermined pressure level, so that light rays emanating from said colored surface are reflected at said interface within said housing before said piston reaches said end position, and said light rays emanating from said colored surface are transmitted through to said display position when said piston reaches said end position and said first color is visible from outside said housing.

2. The device of claim 1 wherein said optically transparent element protrudes from said housing and said display surface has a lens-shaped curvature.

3. The device of claim 1 wherein said cavity is conically shaped at least in a region which is across from said colored zone.

4. The device of claim 1 wherein said colored surface is conically shaped at least in a region which is across from said colored zone when said piston is in said end position.

5. The device of claim 1 further comprising a spring which produces said restoring force, said spring having a fist end which is supported by said housing and a second end which pushes said piston in a direction away from said display surface.

6. The device of claim 1 wherein said colored surface is located on a part made of an elastically deformable material.

7. The device of claim 1 wherein said second colored zone comprises a colored elastic seal in contact with said optically transparent element.

8. The device of claim 1 wherein said piston comprises a membrane having an integral elastomeric filler piece supporting said colored surface.

9. The device of claim 1 wherein said circumferential surface having said second colored zone is inclined relative to said longitudinal axis.

10. The device of claim 1 wherein said circumferential surface having said second colored zone extends from an interior portion of said optically transparent element outwardly towards an external wall of said optically transparent element.

* * * * *